(12) United States Patent
Zhou et al.

(10) Patent No.: US 9,886,272 B1
(45) Date of Patent: Feb. 6, 2018

(54) TRANSFORMATION OF A WEB APPLICATION INTO A HYBRID MOBILE APPLICATION

(71) Applicant: SAP SE, Walldorf (DE)

(72) Inventors: Yiquan Zhou, Singapore (SG); Yean Fee Ho, Singapore (SG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/368,713

(22) Filed: Dec. 5, 2016

(51) Int. Cl.
*G06F 9/45* (2006.01)
*G06F 9/44* (2006.01)

(52) U.S. Cl.
CPC . *G06F 8/76* (2013.01); *G06F 8/40* (2013.01)

(58) Field of Classification Search
CPC ....................................................... G06F 9/45
USPC ................................................. 717/136–140
See application file for complete search history.

(56) References Cited

U.S. PATENT DOCUMENTS

| | | | |
|---|---|---|---|
| 9,578,085 B2 * | 2/2017 | Smith | H04L 67/02 |
| 2013/0067328 A1 * | 3/2013 | Salyards | G06F 17/30769 715/716 |
| 2014/0164944 A1 | 6/2014 | Sivakumar et al. | |
| 2015/0066896 A1 * | 3/2015 | Davis | G06F 17/30991 707/710 |
| 2015/0378685 A1 | 12/2015 | Kaplinger et al. | |

FOREIGN PATENT DOCUMENTS

WO   2015176443 A1   11/2015

OTHER PUBLICATIONS

Jack Madden, "There are a ton of different ways to mobilize enterprise apps. Great! Now who's actually doing that right now?", Brian Madden, Apr. 1, 2014, BrianMadden.com.
WaveMaker, "WaveMaker Helps Enterprises Add Mobile Interfaces to Existing Apps with Delivery of Hybrid Mobile Rapid App Development (MRAD)", Press Releases, Dec. 9, 2015, WaveMaker, Inc., Mountain View, California.
StarMobile, "We Rapidly Mobilize Any Enterprise Application", StarMobile, retrieved on Jan. 15, 2016, StarMobile, Inc., https://starmobileinc.com, Atlanta, GA.

* cited by examiner

*Primary Examiner* — Jae Jeon
(74) *Attorney, Agent, or Firm* — Jones Day

(57) ABSTRACT

Described herein is a framework for transforming a web application (App) into a hybrid mobile App. The framework is used in a process for generating a hybrid mobile App package in a container, such as a Cordova container. The hybrid mobile App package includes a transformation interface with a transformation mapping database which provides a one-to-one mapping of data services utilized by the transformed hybrid mobile App. During runtime, a runtime interface retrieves the data configuration information of the hybrid mobile App based on the transformation mapping database. As such, the transformation is achieved without modifying source code of the original web App.

20 Claims, 4 Drawing Sheets

400

TRANSFORMATION OF A WEB APPLICATION INTO A HYBRID MOBILE APPLICATION

TECHNICAL FIELD

The present disclosure relates generally to a framework for transforming web landscape applications into mobile landscape applications.

BACKGROUND

A hybrid mobile application (App) which is generated based on Cordova container runs a web App as a content asset. When mobilizing a web App that runs in a cloud or on-premise system landscape to be a hybrid mobile App, the web App usually inherits the data configurations of the cloud or on-premise system landscape, especially in large-scale enterprise system. However, these data configurations are not compatible with devices that run in the mobile landscape. As a result, developers are required to manually change the data configurations inside the web App content to be compatible with the mobile landscape.

The shortcomings become apparent for a large scale enterprise system, such as Fiori Apps for S/4 HANA system, where a collection of Apps carry out different tasks according to various personas in different business scenarios. Under such circumstance, extensive development effort is required to ensure that all the Apps are compatible with the mobile landscape in mobilizing a large scale enterprise solution. However, employing extensive development effort not only imposes high cost, but also hinders a rapid development and a timely delivery of enterprise solution.

Therefore, it is desirable to provide efficient automatic transformation of cloud or on-premise system landscape Apps into mobile landscape Apps for effectively mobilizing Apps in large scale enterprise system.

SUMMARY

A framework for transforming a web App into a hybrid mobile App is described herein. In accordance with one embodiment of the framework, a web App is provided to an integrated development environment (IDE). Data service configuration of the web App is abstracted into metadata1. Mobile data service configuration is abstracted from a mobile service server into metadata2 based on metadata1. A transformation mapping database is generated from metadata1 and metadata2. The transformation mapping database includes a transformation map which maps the data service configuration of the web App from metadata1 to the mobile data service configuration from metadata2. A hybrid mobile App package is built. The hybrid mobile App package includes the web App, the transformation mapping database, a user interface (UI) library, and a runtime translator. The web App, the transformation mapping database, the UI library and runtime translator are packaged in a container.

In one embodiment, an App development system for transforming a web App into a hybrid mobile App is disclosed. The system includes an integrated development environment (IDE) module, a build module and an App transformation module (ATM) for transforming the web App into the hybrid mobile App. The ATM includes a data configuration analyzer unit, a transformation interface unit, a user interface (UI) library unit and a runtime translator unit. The data configuration analyzer analyzes a source code of the web App to abstract data service configuration from the source code as metadata1, and abstracts mobile data service configuration as metadata2 from a mobile service server based on metadata1. The transformation interface unit generates a transformation mapping database. The transformation mapping database maps the data service configuration of the web App from metadata1 to the mobile data service configuration from metadata2. The UI library unit includes a UI library. The runtime translator unit obtains the mobile data service configuration from the transformation mapping database and constructs a data model based on the mobile data service configuration and UI elements from the UI library. The build module packages the web App, the transformation mapping database, the UI library unit and the runtime translator unit in a container to generate a hybrid mobile App package.

In another embodiment, a non-transitory computer-readable medium having stored thereon program code executable by a computer to perform instructions is disclosed. The instructions performed by the program code include providing a web App to an integrated development environment (IDE). Data service configuration of the web App is abstracted into metadata1. Mobile data service configuration is abstracted from a mobile service server into metadata2 based on metadata1. A transformation mapping database is generated from metadata1 and metadata2. The transformation mapping database includes a transformation map which maps the data service configuration of the web App from metadata1 to the mobile data service configuration from metadata2. The transformation mapping database includes a one-to-one mapping of the data service configuration of the web App based on metadata1 to the mobile data service configuration based on metadata2. A hybrid mobile App package is built for a specified mobile platform of a client device. The hybrid mobile App package includes the web App, the transformation mapping database, a user interface (UI) library, a runtime translator, and plugins as a content asset in the specified mobile platform. The web App, the transformation mapping database, the UI library, runtime translator and plugins are packaged in a container.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

It should be appreciated that the framework described herein may be implemented as a method, a computer-controlled apparatus, a computer process, a computing system, or as an article of manufacture such as a computer-usable medium. These and various other features and advantages will be apparent from the following description.

Figure 1:
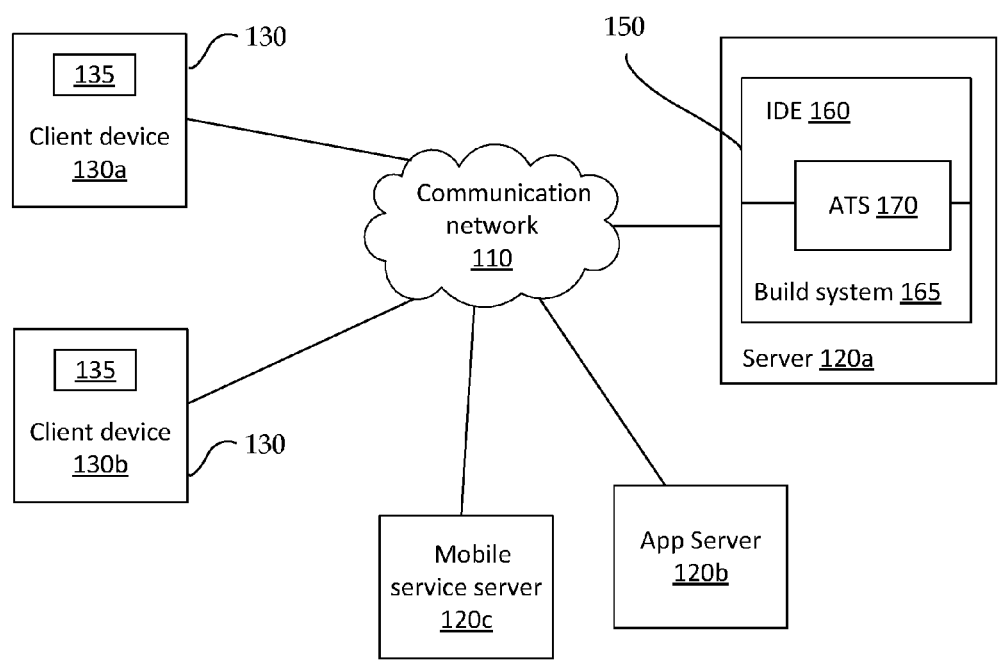
FIG. 1 is a block diagram illustrating an exemplary environment.

FIG. 1 shows a simplified diagram of an exemplary environment or architecture 100. Environment 100 may have a distributed architecture, such as a client-server architecture. As shown, the environment includes, for example, a plurality of servers 120a-c interconnected by a communication network 110. For example, the environment includes servers 120a-b. The environment may include many more servers. The communication network may be an internet or a WiFi communication network. Other types of communication networks, such as an intranet or a combination of different types of communication networks may also be useful.

A server may be a computer with a memory and a processor. Various types of computers may be employed for the server. For example, the computer may be a mainframe, a workstation, as well as other types of processing devices. The memory of a computer may include any memory or database module. The memory may be volatile or non-volatile types of non-transitory computer-readable media, such as magnetic media, optical media, random access memory (RAM), read-only memory (ROM), removable media, or any other suitable local or remote memory component.

A server may be configured to store and process resources requested by client devices 130. As shown, the environment includes first and second clients 130a-b. Of course, the environment may include numerous clients. A client device may be a local computing device with, for example, a local memory and a processor. The memory may be volatile or non-volatile types of non-transitory computer-readable media, such as magnetic media, optical media, random access memory (RAM), read-only memory (ROM), removable media, or any other suitable local or remote memory component. Various types of processing devices may serve as the client device. For example, the client device may be a PC, a tablet PC, a workstation, a network computer, or a mobile computing device, such as a laptop, a tab or a smart or mobile phone. Other types of processing devices may also be used.

The environment of the client device may be referred to as a local or native environment. A client or end-user and client device may be used interchangeably. For example, when referring to an end-user, it is understood that the end-user connects to the communication network using a client device. The client device may be referred to as the client side while the server may be referred to as the server side. It is understood that client devices need not be of the same type. For example, some client devices may be mobile devices running different types of platforms, such as iOS or Android, while other devices may be desktop or laptop computers.

In one implementation, the local environment of the client device includes an App interface 135. The App interface, for example, may be a web browser. The browser facilitates communication with the server. For example, the browser initiates communication to a web server by making a request for a specific resource using, for example, a Hypertext Transfer Protocol (HTTP) and the server responds with the content of that resource. Communication with the server, for example, may be through internet connection. The internet connection may be using a mobile telecommunication network, such as a 4G network. Other types of connections to the server may also be useful. An end-user may access the server by, for example, having a user account.

In one embodiment, the environment 100 includes a development system 150. The development system, for example, resides on an App development server 120a. The development system, for example, is used to create, build, package and deploy Apps. The development system, in one embodiment, includes a software tool 160 such as an integrated development environment (IDE), a build system 165 and an App transformation module or system (ATS) 170.

The IDE may be a web-based or web IDE. The web IDE is accessed by a web browser 135 on a client device 130. For example, a developer or end-user may log on to the server containing the IDE, thereby accessing the IDE from the web browser of a client device. The IDE, for example, may be a SAP Web IDE from SAP SE. Other types or configurations of IDEs may also be useful.

In one embodiment, the ATS is integrated into the IDE and build system. The ATS transforms Apps from a first platform to a second platform. In one embodiment, the ATS transforms an App running on a web platform (web App) to an App running on a mobile platform, such as a hybrid mobile App. The web Apps, for example, may be Fiori web Apps based on Fiori from SAP SE while the mobile platform or mobile landscape system may include SAP Mobile Platform or SAP HANA Cloud Platform for mobile services. Other types of web Apps or mobile platforms may also be useful. As described, the ATS is integrated as part of the IDE and build system. In some embodiments, the ATS may be a stand-alone tool. Other configurations of the ATS may also be useful.

The build system builds and packages a web App and its associated source code and metadata in a mobile container. For example, a transformed hybrid mobile App package includes a transformed hybrid mobile App and a container. In one embodiment, the container is a Cordova container. For example, the transformed hybrid mobile App package is a Cordova hybrid mobile App package. Other types of hybrid mobile App packages utilizing other types of containers may also be useful.

The mobile container serves as a runtime of the hybrid mobile App. The mobile container is configured to run on a desired mobile platform. For example, the mobile container may be configured to run on an iOS, Android or other mobile platforms. Configuring the container to run on other platforms of client devices may also be useful. For example, the platforms can include laptop or desktop platforms as well. For example, the hybrid mobile App package produced may run on a specified platform of a client device. Different hybrid mobile App packages may be produced for different platforms.

The transformed hybrid mobile App packages may be deployed to an App server 120b. The App server, for example, serves as an App distribution center, such as an App market place. It is understood that different App servers may be provided for different platforms. For example, different App servers may be provided for hybrid mobile App packages configured to run on iOS and Android platforms.

A user may download a hybrid mobile App package on the App server. For example, a user may access the App server using a client device. A selected hybrid mobile App package on the App server is installed onto the client device. When the App is started, the container starts and serves as a runtime of the App on the client device. The App accesses a mobile service server 120c. The mobile service server includes mobile services, such as data routing, authorization and management, utilized by the hybrid mobile App running on the client device. For example, the mobile service serve include mobile services utilized by the hybrid mobile App during runtime.

Although servers 120a-c are shown as separate servers interconnected by the communication network, they may be interconnected and form, for example, part of a data center. The servers of a data center may be interconnected by an intranet, a local area network (LAN), a wide area network (WAN) or a combination thereof. The servers of a data center may be located in a single or multiple locations. The servers of the data center, for example, may provide cloud services. For example, the servers of a data center may be part of the cloud for providing cloud services. The cloud services may be SAP HANA Cloud Platform for mobile services from SAP SE. Other types of clouds and cloud providers may also be useful. Other configurations of the servers may also be useful. For example, the servers may be part of an on-premise system.

Figure 2:
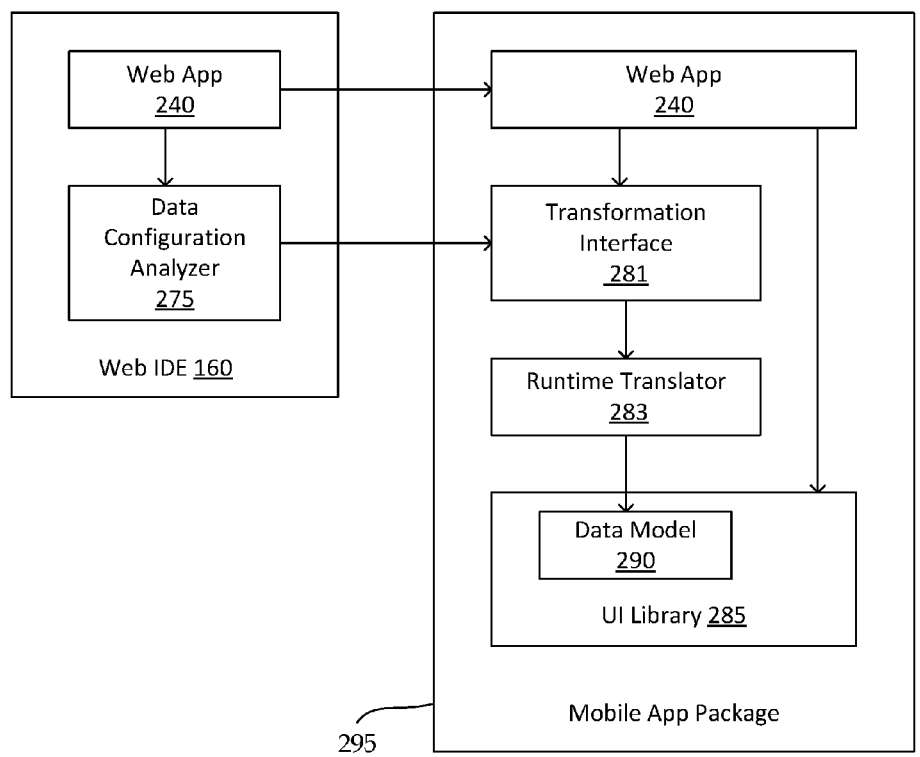
FIG. 2 shows an exemplary architecture of a transformation solution for transforming a web App into a hybrid mobile App.

FIG. 2 shows an exemplary architecture 200 of a transformation solution for transforming a web App into a hybrid mobile App. The App for example, is developed as a web App and transformed into a hybrid mobile App. As discussed, the solution employs a development system 150. The development system includes an IDE 160. The IDE may be a web-based IDE residing on a cloud or an IDE residing on an on-premise system.

In one embodiment, the IDE 160 includes a data configuration analyzer module 275. The data configuration analyzer module 275 may be embedded or integrated in the IDE 160. Providing the data configuration analyzer module as other parts of the development system may also be useful. The data configuration analyzer module, for example, may be employed to abstract data service configuration used by a web App 240 into metadata. For example, the source code of the web App is analyzed by the data configuration analyzer module and metadata of data service configuration used is abstracted during design time. The data configuration analyzer module also obtains data service configuration from the mobile service server. The web App, in one embodiment, is a Fiori App. For example, metadata of data service configuration is abstracted from the source code of the Fiori App. Other types of web Apps may also be useful.

The data service configuration, for example, corresponds to the data service configuration used by the App. The data service configuration may include the routing, proxy, and security configuration for accessing an interface in the mobile landscape (platform) for a hybrid mobile App. For example, data service configuration may include proxy configuration for accessing the mobile service server. The proxy configuration may be set by the administrator in management system of the mobile service server. The management system may include SAP Mobile Platform (SMP) or SAP HANA Cloud Platform for mobile services.

The web App and metadata abstracted by the data configuration analyzer module are used to generate the hybrid mobile App package 295. The hybrid mobile App package, as shown, includes the web App 240, a transformation interface 281, a runtime translator 288 and a UI library 285. The transformation interface 281 and runtime translator 288 are provided by, for example, the ATS. The various components, including the web App, are packaged into a container, such as a Cordova container to form the hybrid mobile App package 295. Plugins and additional components utilized by the App are also included in the hybrid mobile package. As discussed, the container is configured to run on a specified platform.

In one embodiment, the transformation interface 281 includes a transformation mapping database. The transformation mapping database provides a one-to-one mapping of data services by the web App to data services of the transformed hybrid mobile App. The transformation mapping database is based on the metadata from the data configuration analyzer module. The configuration metadata for data services of the hybrid mobile App is used by the OData layer. The transformation interface, for example, acts as a data interface between the data configuration analyzer module 275 and the runtime translator 283.

As for the runtime translator 283, it translates, for example, a data service path into a mobile platform or mobile landscape system based on the transformation mapping database at runtime. The data service path, for example, is a directory path according to an access root of the mobile service server in the mobile landscape. In one implementation, the runtime translator is integrated into the OData service. For example, the landscape configuration metadata received at the runtime translator is incorporated into the request interfaces whenever an OData request is constructed.

The UI library 285 includes resources for adapting UI from a web App to a hybrid mobile App. In one embodiment, the UI library 285 includes a data model 290. The data model may adopt the Model-View-Controller (MVC) concept for separating representation of information from user interaction. The Model aspect manages the source data of an App. The View aspect is responsible for defining and rendering the UI. For example, it may include design resources, such as layout command resources. The design resource, for example, may include mobile controls and mobile UI components for facilitating the hybrid mobile App building. The Controller aspect reacts to view events and user interaction by modifying the View and Model aspects. The data model, for example, may be predefined to include protocols for constructing the OData request and parsing OData response. In one embodiment, the data model is integrated with the runtime translator module during a runtime mechanism.

The various components of the hybrid mobile App package enable easy transformation of a web App into a hybrid mobile App without changing any source code of the original web App. For example, data service configurations of the web App are transformed to access the same data service from a mobile device during runtime.

As described, the data configuration analyzer module is part of the IDE, the transformation interface and runtime translator are part of the hybrid mobile App package, and the data configuration analyzer, transformation interface and runtime translator are part of the ATS. Other configurations of the IDE, ATS and hybrid mobile App package may also be useful. For example, in the case of a stand-alone ATS, the data configuration analyzer module may be part of the ATS. In some cases, the ATS may be part of the IDE. For example, the ATS may pass the final information to the build system for packaging.

Figure 3:
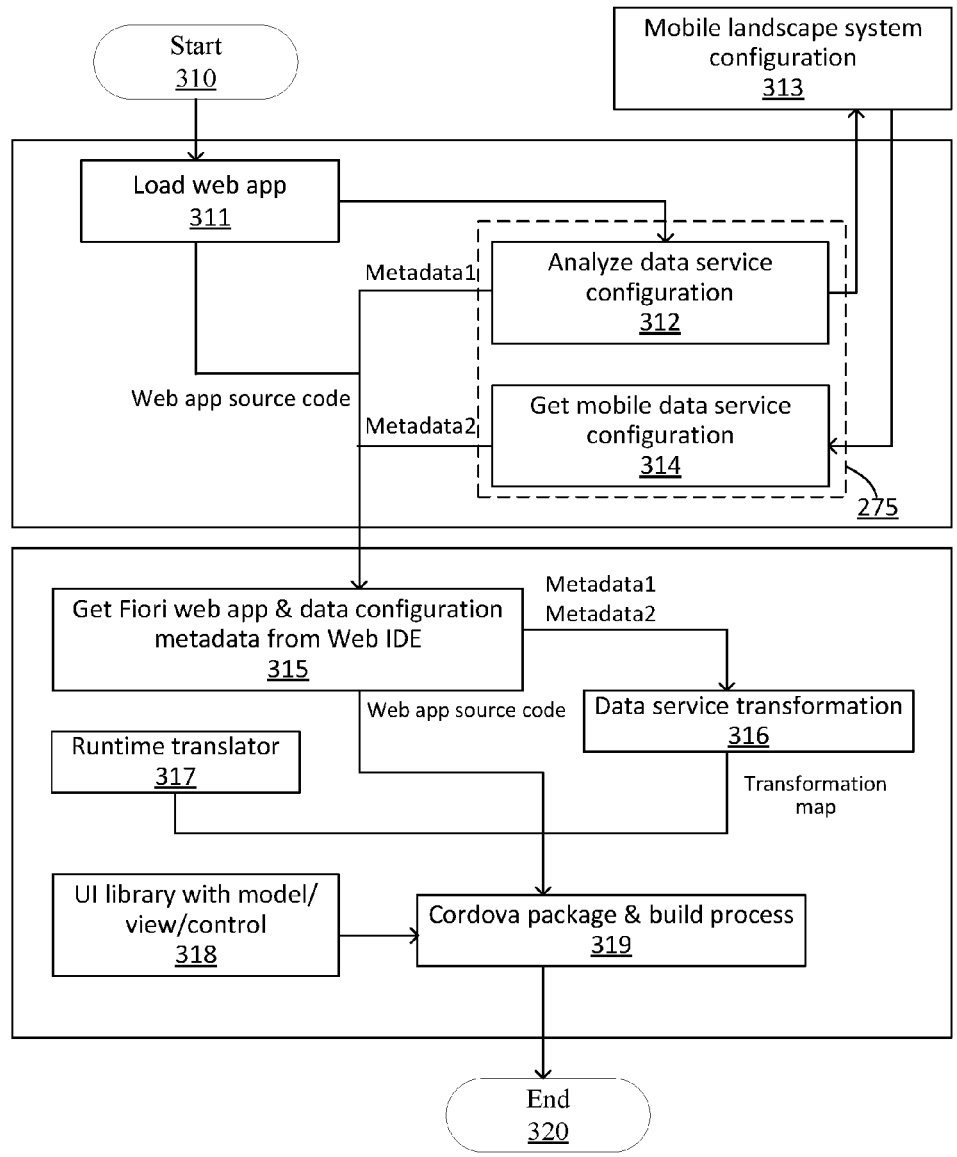
FIG. 3 shows an exemplary method of transforming a web App into a hybrid mobile App.

FIG. 3 shows an exemplary process flow 300 for transforming a web App into a hybrid mobile App. The process flow includes various procedures performed automatically by the development system 150 and ATS 170.

The process flow may commence at procedure 310. For example, a user may initiate an App transformation project by accessing the development system. The user, for example, accesses the development system using a client device. The transformation project transforms a web App into a hybrid mobile App. The web Apps, for example, may be Fiori web Apps based on Fiori from SAP SE while the hybrid mobile App is based on SAP Mobile Platform or SAP HANA Cloud Platform for mobile services. Other types of web Apps or hybrid mobile Apps may also be useful.

At procedure 311, a web App is provided to the development system. The web App, for example, may be developed by the user using the development system. Alternatively, the web App may exist on a server, such as a App server. In such case, the user provides the web App to the development system. The user may specify the mobile platform for which the transformation project is designed. For example, the user may specify the platform on which the transformed App is to be run. The specified platform may be Android, iOS, Windows, BlackBerry 10 or other operating systems or platforms.

The web App is analyzed at procedure 312 to determine the data service configuration. For example, the analysis procedure is performed by the data configuration analyzer module 275 in the IDE 160. The data configuration analyzer module analyzes the data service configuration of the source code of the web App and abstracts the data service configuration into data service metadata (metadata1). The abstracted metadata1 includes cloud-based or on-premise system path/routing of data utilized by the web App.

The data configuration analyzer module accesses the mobile service server at procedure 313. In one embodiment, the analyzed configuration, including the cloud-based or on-premise system path/routing of the web App, is provided to the mobile service server as input parameters for identifying mobile data service configuration which corresponds to the cloud-based or on-premise system data service configuration of the web App. The corresponding configuration, for example, includes path/routing for accessing the same resource or data server on the cloud or on-premise system. The data configuration analyzer module retrieves the identified mobile data service configuration from the mobile service server at procedure 314. The retrieved configuration is analyzed and abstracted into mobile data service metadata (metadata2). The abstracted metadata2 is stored in a mapping database. In one embodiment, procedure 312 produces metadata (metadata1) related to data service configurations of web App while procedure 314 produces metadata (metadata2) related to data service configurations of the hybrid mobile App which corresponds to the data service configurations of the web App.

The source code of the web App and the metadata generated from the data configuration analyzer module from procedures 312 and 314 are provided at procedure 315. The metadata from procedures 312 and 314 are analyzed by data service transformation procedure 316. The data service transformation procedure may be performed by the transformation interface. The transformation interface acts as a data interface between the data configuration analyzer module and the runtime translator module. The data service transformation procedure analyzes the metadata and generates a data service transformation mapping database. The transformation mapping database, for example, is a transformation map which maps data service configurations (in the form of metadata) of the web App to mobile data service configurations (in the form of metadata). For example, a one-to-one mapping is generated for the web App and hybrid mobile App data service configurations.

In one embodiment, a one-to-one database mapping (or transformation) is performed to retrieve the mobile data service configurations stored in the mapping database. An identical data entry identification (ID) is assigned to the corresponding data service configurations in the cloud (or on-premise system) and mobile service server. For example, the mapping relation is obtained through looking up and retrieving the mobile data service configuration in the mapping database. The identical ID is then assigned to the metadata entries. The configuration in the form of metadata is processed and reformatted in the transformation interface. The processed and reformatted mobile data service configuration metadata is stored in the generated transformation mapping database. In one embodiment, the transformation mapping database is a database. In other embodiments, the transformation mapping database may be a data file, such as XML, JSON or other suitable file format. The data file, for example, is stored in the subsequently built hybrid mobile App package and consumed at runtime. Other configurations of transformation mapping database may also be useful.

A build procedure 319 is performed. The build procedure employs the source code of the web App, runtime translator, UI library and the transformation map. The runtime translation procedure, for example, is performed by the runtime translator. The runtime translator translates the data service path from the transformation map during runtime. The UI library, for example, may be a SAP UI5 library. Other types of UI libraries may also be useful. The web App, runtime translator, UI library and transformation map are packaged in a container. This, along with other necessary components in the hybrid mobile application package solution, forms a hybrid mobile App package. In one embodiment, the App is packaged in a Cordova container. Packaging the App in other types of containers may also be useful. The hybrid mobile App package, for example, completes the design time process.

At runtime, if the App is running on a mobile device, the runtime translator constructs a data model based on the hybrid mobile App data service configuration. For example, the hybrid mobile data service configuration is obtained from the transformation map. As such, the web App can be transformed into a hybrid mobile App without changing the source code of the original web App.

Figure 4:
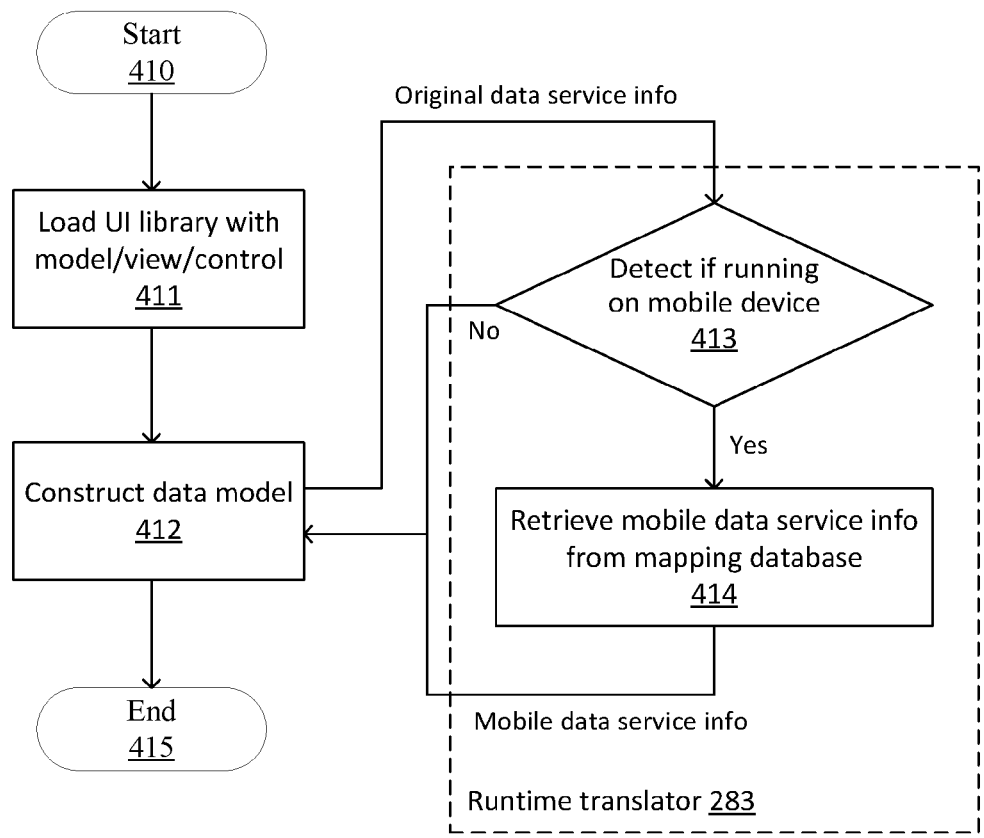
FIG. 4 shows an exemplary logic flow of a runtime translator.

FIG. 4 shows an exemplary logic flow 400 of a runtime translator 283 of the ATS. At procedure 410, the hybrid mobile App starts. The UI library load procedure 411 is performed when the App is started. A data model construction procedure 412 may be performed when the UI elements from the UI library are constructed and rendered. The runtime translator is started when a data model is being constructed.

A detection procedure 413 is performed. The detection procedure is performed by, for example, the runtime translator. The runtime translator detects if the App is running on a mobile device or not. For example, the detection procedure determines if the App is running on a mobile device or in a web browser. If not, the original data service information of the web App is used by data model procedure 412 to construct the data model. On the other hand, if the App is running on a mobile device, retrieval procedure 414 is performed. The retrieval procedure retrieves mobile data service information from the generated transformation map.

The retrieved mobile data service information is used to construct the data model by the build data model procedure 412. Once the data model is constructed, the flow ends at 415.

The present framework, as described, results in numerous advantages. For example, the present framework offers a unified solution to all enterprise applications, as compared to normal development routine. As a result, developers do not need to change the landscape configuration for every App one by one. Furthermore, the present framework offers a codeless development experience when integrating in a web IDE. For example, developers can automatically get the mobile landscape configuration of a Web App and keep it as metadata, which is then used in transforming the web App into a hybrid mobile App. Therefore, all the web enterprise applications can be mobilized as hybrid mobile Apps without editing or altering the source code.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method for transforming a web application (App) into a hybrid mobile application (App) comprising:
    providing the web App to an integrated development environment (IDE);
    abstracting data service configuration of the web App into metadata1;
    abstracting mobile data service configuration from a mobile service server into metadata2 based on the metadata1;
    generating a transformation mapping database from the metadata1 and the metadata2, wherein the transformation mapping database comprises a transformation map which maps and transforms the data service configuration of the web App from the metadata1 to the mobile data service configuration from the metadata2;
    building a hybrid mobile App package, wherein the hybrid mobile App package comprises
        the web App,
        the transformation mapping database,
        a user interface (UI) library comprising UI elements used by the hybrid mobile App,
        a runtime translator, and
        wherein the web App, the transformation mapping database, the UI library and runtime translator are packaged in a container;
    starting the hybrid mobile App when the hybrid mobile package is downloaded and installed on a client mobile device;
    loading the UI library when the hybrid mobile App is started;
    constructing and rendering UI elements from the UI library,
    starting the runtime translator when the UI elements are constructed and rendered;
    detecting if the hybrid mobile App is running on a client mobile device;
    in response to detecting that the hybrid mobile App is running on the client mobile device, retrieving mobile data configuration from the transformation mapping database and constructing a data model based on the retrieved mobile data service configuration; and
    in response to detecting that the hybrid mobile App is not running on the client mobile device, constructing a data model based on the data service configuration of the web App.

2. The method of claim 1, wherein building the hybrid mobile App package further comprises specifying a mobile platform of a client device on which the mobile hybrid package is to be installed.

3. The method of claim 2, wherein specifying the mobile platform of the client device comprises specifying one of Android, iOS, Windows, BlackBerry 10 or other operating systems.

4. The method of claim 1, wherein the IDE comprises a web-based IDE residing on a server.

5. The method of claim 1, wherein the container comprises a Cordova container.

6. The method of claim 1, wherein the hybrid mobile App package further comprises plugins as a content asset in a mobile platform of a client device.

7. The method of claim 1, wherein the transformation mapping database comprises a one-to-one mapping of the data service configuration of the web App based on the metadata1 to the mobile data service configuration based on the metadata2.

8. The method of claim 7, wherein the mobile data service configuration comprises connection path/routing and corresponding connection path/routing of utilized data.

9. The method of claim 1, further comprising deploying the hybrid mobile App package to an App distribution server for downloading and installing onto a client device by a user.

10. The method of claim 9, wherein the web App, transformation mapping database, runtime translator and UI library packaged in the container transform the web App into the hybrid mobile App without changing original source code of the web App.

11. The method of claim 1, wherein:
    the web App comprises a Fiori App; and
    the UI library comprises a SAP UI5 library.

12. The method of claim 1, wherein the transformation mapping database comprises a data file.

13. The method of claim 12, wherein the data file comprises a XML file or a JSON file.

14. A non-transitory computer-readable medium having stored thereon program code executable by a computer to perform instructions, wherein performing instructions by the program code comprises:
    providing a web application (App) to an integrated development environment (IDE);
    abstracting data service configuration of the web App into metadata1;
    abstracting mobile data service configuration from a mobile service server into metadata2 based on the metadata1;
    generating a transformation mapping database from the metadata1 and the metadata2, wherein the transformation mapping database comprises a transformation map which maps and transforms the data service configuration of the web App from the metadata1 to the mobile data service configuration from the metadata2, wherein the transformation mapping database comprises a one-to-one mapping of the data service configuration of the web App based on the metadata1 to the mobile data service configuration based on the metadata2;
    building a hybrid mobile App package for a specified mobile platform of a client device, wherein the hybrid mobile App package comprises
        the web App, the transformation mapping database,
a user interface (UI) library comprising UI elements used by a hybrid mobile application (App),
a runtime translator,
plugins as a content asset in the specified mobile platform, and
wherein the web App, the transformation mapping database, the UI library, runtime translator and plugins are packaged in a container;
starting the hybrid mobile App when the hybrid mobile package is downloaded and installed on a client mobile device;
loading the UI library when the hybrid mobile App is started;
constructing and rendering UI elements from the UI library,
starting the runtime translator when the UI elements are constructed and rendered;
detecting if the hybrid mobile App is running on a client mobile device;
in response to detecting that the hybrid mobile App is running on the client mobile device, retrieving mobile data configuration from the transformation mapping database and constructing a data model based on the retrieved mobile data service configuration; and
in response to detecting that the hybrid mobile App is not running on the client mobile device, constructing a data model based on the data service configuration of the web App.

15. A system for transforming a web application (App) into a hybrid mobile application (App) comprising:
at least one data processor; and
memory storing instructions which, when executed by the at least one data processor, result in operations comprising:
providing the web App to an integrated development environment (IDE);
abstracting data service configuration of the web App into metadata1;
abstracting mobile data service configuration from a mobile service server into metadata2 based on the metadata1;
generating a transformation mapping database from the metadata1 and the metadata2, wherein the transformation mapping database comprises a transformation map which maps and transforms the data service configuration of the web App from the metadata1 to the mobile data service configuration from the metadata2;
building a hybrid mobile App package, wherein the hybrid mobile App package comprises:
the web App,
the transformation mapping database,
a user interface (UI) library comprising UI elements used by the hybrid mobile App,
a runtime translator, and
wherein the web App, the transformation mapping database, the UI library and runtime translator are packaged in a container;
starting the hybrid mobile App when the hybrid mobile package is downloaded and installed on a client mobile device;
loading the UI library when the hybrid mobile App is started;
constructing and rendering UI elements from the UI library;
starting the runtime translator when the UI elements are constructed and rendered;
detecting if the hybrid mobile App is running on a client mobile device;
in response to detecting that the hybrid mobile App is running on the client mobile device, retrieving mobile data configuration from the transformation mapping database and constructing a data model based on the retrieved mobile data service configuration; and
in response to detecting that the hybrid mobile App is not running on the client mobile device, constructing a data model based on the data service configuration of the web App.

16. The system of claim 15, wherein building the hybrid mobile App package further comprises specifying a mobile platform of a client device on which the mobile hybrid package is to be installed.

17. The system of claim 16, wherein specifying the mobile platform of the client device comprises specifying one of Android, iOS, Windows, BlackBerry 10 or other operating systems.

18. The system of claim 15, wherein the IDE comprises a web-based IDE residing on a server.

19. The system of claim 15, wherein the hybrid mobile App package further comprises plugins as a content asset in a mobile platform of a client device.

20. The system of claim 15, wherein:
the transformation mapping database comprises a one-to-one mapping of the data service configuration of the web App based on the metadata1 to the mobile data service configuration based on the metadata2;
the mobile data service configuration comprises connection path/routing and corresponding connection path/routing of utilized data; and
wherein the hybrid mobile App package is deployed to an App distribution server for downloading and installing onto a client device by a user.

* * * * *